United States Patent [19]

Freeman et al.

[11] Patent Number: 4,954,950
[45] Date of Patent: Sep. 4, 1990

[54] TERMINAL COMMUNICATIONS CIRCUIT

[75] Inventors: William A. Freeman, Austin; James S. Pogorzelski, Georgetown; Darryl W. Solie; Jacqueline H. Wilson, both of Austin, all of Tex.

[73] Assignee: International Business Machines Corporation, Armonk, N.Y.

[21] Appl. No.: 908,532

[22] Filed: Sep. 17, 1986

[51] Int. Cl.$^5$ .................... G06F 13/14; G06F 13/42; H04J 3/12
[52] U.S. Cl. .................. 364/200; 364/228.4; 364/240.8; 364/239.9; 364/242.94; 370/85
[58] Field of Search ... 364/200 MS File, 900 MS File, 364/200, 900; 370/85, 110.1

[56] References Cited

U.S. PATENT DOCUMENTS

| | | | |
|---|---|---|---|
| 3,723,973 | 3/1973 | Kennedy | 364/200 |
| 4,200,930 | 4/1980 | Rawlings et al. | 364/200 |
| 4,363,093 | 12/1982 | Davis et al. | 364/200 |
| 4,433,378 | 2/1984 | Leger | 364/200 |

OTHER PUBLICATIONS

Recommendation X.21 entitled "Interface Between Data Terminal Equipment (DTE) and Data Circuit Terminating Equipment (DCE) for Synchronous Operation on Public Data Networks".
"Welcome to the Standards Jungle" from BYTE, Feb., 1983, pp. 146 through 178.
Article on Intel 80C51 8 bit micro-controller and a zilog Z8530 Serial Communications Controller.

*Primary Examiner*—Gareth D. Shaw
*Assistant Examiner*—Paul Kulik
*Attorney, Agent, or Firm*—Thomas E. Tyson; Marilyn D. Smith

[57] ABSTRACT

A terminal communications circuit that provides communication through a bus interface circuit to a network bus in accordance with the predetermined communications procedure, the terminal communications circuit including a communications interchange circuit that exchanges protocol signals with the bus interface circuit in response to commands received from a signal state controller that is resident in the terminal. The communications interchange circuit further provides communications state change information to the signal state controller to indicate the contents of the protocol signals from the bus information circuit. The signal state controller executes one of a plurality of program states to control communications over the network bus in accordance with predetermined communications procedure by providing commands to the communications interchange circuit in acordance with the program state that the signal state controller is currently executing. The signal state controller changes the program state in response to the communications state change information from the communications interchange circuit. Also provided is a single command from the signal state controller to the communications interchange circuit that results in the communications interchange circuit providing a multiple of individual protocol signal patterns to the bus interface circuit enabling multiple communications procedures to be performed on the communications network with a single command from the signal state controller.

15 Claims, 10 Drawing Sheets

PRIOR ART

FIG. 1A

PRIOR ART

| HEX VALUE | INDICATE STATE | RECEIVE DATA STATE |
|---|---|---|
| '01' H | I = OFF | R = IA5 PLUS |
| '02' H | I = OFF | R = IA5 BEL |
| '03' H | I = OFF | R = 0 |
| '04' H | I = OFF | R = 01 (ALTERNATING) |
| '05' H | I = OFF | R = 1 |
| '06' H | I = OFF | R = X |

FIG. 7B

| ENCODED VALUE | ERROR/STATUS INDICATED |
|---|---|
| '00' H (RECEIVE ERRORS) | NO ERROR/STATUS |
| '04' H | DMA RECEIVE BUFFER NOT LARGE ENOUGH |
| '0E' H | RECEIVE OVERRUN ERROR |

FIG. 7C

TERMINAL COMMUNICATIONS CIRCUIT

TECHNICAL FIELD

The present invention relates to communications interfaces between computers and more specifically to terminal communications circuits that are connected to a network bus to provide communications among terminals across the network in accordance with a predetermined communications procedure.

BACKGROUND ART

As computers have evolved, communication between computers has become desirable. In the past, several communications standards have been established to allow communications between computers and between computers and computer terminals. Recently, the CCITT (International Telegram and Telephone Consultive Committee) has proposed a Recommendation X.21 (herein incorporated by reference). The CCITT, an agency of the United Nations, issues recommendations rather than standards. While in the past, the CCITT recommendations have been almost identical to the standards of the Electrical Industries Association (EIA) standards such as the RS-232 communications standard, the X.21 Recommendation differs significantly from any of the present EIA standards. Briefly, the X.21 Recommendation provides an interface specification for data equipment connecting to a public data network using a digital synchronous format rather than an analog transmission. This X.21 Recommendation is directed to a public data network. The X.21 Recommendation includes the protocol for making and answering calls and for sending and receiving data after a connection is established.

A review of the communications standards is contained in a magazine article entitled "Welcome to the Standards Jungles" in the February, 1983 issue of *BYTE* Magazine, herein incorporated by reference.

One important aspect of implementing data communications is providing a mechanism to recognize certain bit patterns that are provided in serial bit streams from the network. Pending U.S. Patent Application Ser. No. 873,910 filed June 13, 1986 and assigned to the present assignee addresses this problem. In addition to requiring recognition of serial bit stream bit patterns, circuitry must be provided to interface to the communications network in accordance with the pre-described communications procedures of either the EIA standards or the CCITT Recommendations.

In the past, the central processing unit of a computer terminal included software that, when executed, interfaced with the communications network in accordance with the communications procedures. However, as the communications speed requirements increased, requiring the computer terminal processing unit to perform these communications tasks overly burdened the computer terminal. An alternative approach is the provision of a second processing unit in the computer terminal to perform the task of communicating with the network. However, the problem of inter-communications between the computer terminal processing unit and the communications processing unit exists.

It is an object of the present invention to provide a terminal communications circuit that includes a program for execution in the computer terminal processing unit but further provides circuitry to perform much of the network communications tasks resulting in communications control remaining with the computer terminal processing unit while not burdening the computer terminal processing unit with the overhead requirement of the communications procedures.

DISCLOSURE OF THE INVENTION

In accordance with the present invention, a terminal communications circuit is provided for communicating through a bus interface circuit to a network bus in accordance with a predetermined communications procedure and including a communications interchange circuit that exchanges protocol signals with the bus interface circuit in response to commands from a signal state controller. The communications interchange circuit further provides communications state change information to the signal state controller that indicates the contents of protocol signals which have been received from the bus interface circuit. The signal state controller executes one of a plurality of program states to control communications over the network bus in accordance with predetermined communications procedure by providing commands to the communications interchange circuit in accordance with which program state the signal state controller is currently executing. The signal state controller changes the program state in response to the communications state change information that is received from the communications interchange circuit.

Also, in accordance with the present invention, a terminal communications circuit providing communications through a bus interface circuit to a network bus in accordance with the predetermined communications procedure is disclosed. This circuit also includes a communications interchange circuit that exchanges protocol information with the bus interface in response to commands received from the signal state controller. The signal state controller provides commands to the communications interchange circuit to control communications over the network bus in accordance with the predetermined communications procedure. The signal state controller includes the command that causes the communications interchange circuit to provide a multiple of individual protocol signal patterns to the bus interface circuit. This single command capability relieves the signal state controller from the burden of repetitively providing commands to the communications interchange circuit to provide protocol signal patterns required by the communications procedure.

In one embodiment of the present invention, the communications interchange circuit further includes circuitry that provides a data path between the bus interface circuit and the signal state controller enabling the signal state controller to send and transmit data via the communications network. Also in this embodiment, the communications interchange signal includes an electrical interchange circuit that exchanges protocol signals with the bus interface circuit and exchanges protocol control information with a physical interface circuit. The physical interface circuit interprets the protocol information received from the electrical interface circuit and provides the communication state change information to the signal state controller. The physical interface circuit further interprets the commands from the signal state controller and provides protocol information to the electrical interface means to perform the operations specified by these commands. The electrical interchange circuit includes a recognition circuit that recognizes predetermined protocol signal patterns received from the bus interface circuit. The electrical interchange circuit further provides an interrupt signal to the physical interchange circuit when one of these protocol signal patterns has been received. The electrical interchange circuit further includes a register for storing at least a portion of the received and recognized pattern. The physical interchange circuit after receiving the interrupt from the electrical interchange circuit queries the stored protocol pattern in the electrical interchange circuit. This pattern is then analyzed by the physical interchange circuit and, if required, an interrupt signal is provided to the signal state controller to indicate the reception of a predetermined protocol pattern. Further, the physical interchange circuit provides the state change information that indicates the specific protocol patter that has been received. In this manner, the signal state controller is informed of the state of the communications network and is further directed to a successive program state to provide communications over the network in accordance with the communications procedure. In the present invention, the communications state change information actually represents a status code from the physical interchange circuit. Also, the program states in the signal state controller correspond directly to communications states that are specified in the predetermined communications procedure. The signal state controller also includes the capability to receive communications requests from application programs in the computer terminal that are requesting access to the communications network. In this invention, the signal state controller resides in the computer terminal processing unit and communicates with the communications interchange circuit via control, data, interrupt, DMA (Direct Memory Access) and PIO (Programmed Input/Output) lines. The processing of protocol signals in the communications interchange circuit relieves the computer terminal processing unit of the burden of performing protocol interchange tasks while the overall control of the communications network remains in the computer terminal processing unit.

BRIEF DESCRIPTION OF THE DRAWING

The novel features believed characteristic of the invention are set forth in the appended claims. The invention itself, however, as well as other features and advantages thereof, will be best understood by reference to the following description of the Best Mode for Carrying Out the Invention, when read in conjunction with the accompanying figures, wherein:

BEST MODE FOR CARRYING OUT THE INVENTION

Figure 1A:
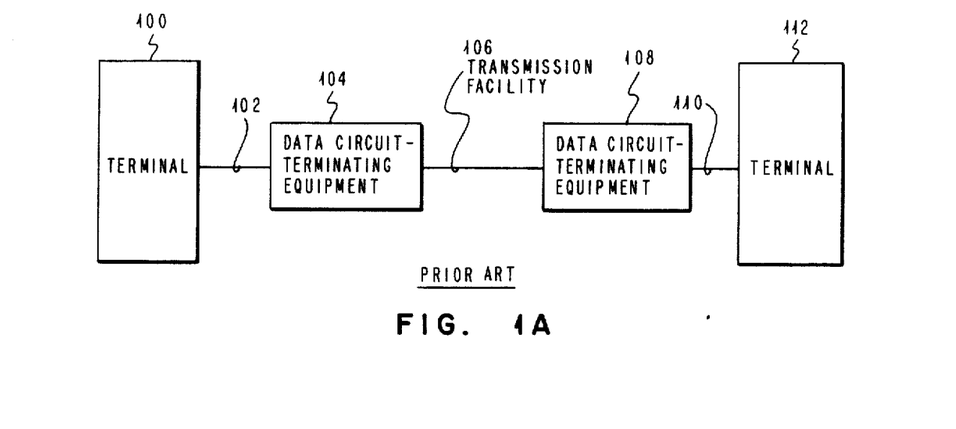
FIG. 1A is a block diagram of a communications network as prescribed by the CCITT X.21 Recommendation.

This invention relates to a communications interface for implementing a predetermined communications network procedure. In the present embodiment, the invention implements the CCITT X.21 Recommendation. The X.21 Recommendation provides the capability for a computer terminal to interface with a telecommunications network. FIG. 1 is a simple block diagram illustrating the communications between two terminals 100 and 112. Terminal 100 is connected via an interface line 102 to a data circuit-terminating equipment (DCE) 104. The data circuit-terminating equipment 104 and 108 are normally supplied by the telecommunications network provider. Likewise, the transmission facility 106 is also supplied and controlled by the telecommunications network provider. For the purposes of this discussion, the Recommendation X.21 defines the communications procedure for a communications network by defining the communications states between the terminal (or data terminal equipment) DTE 100 (as defined by Recommendation X.21) and the data circuit-terminating equipment (DCE) 104.

Figure 1B:
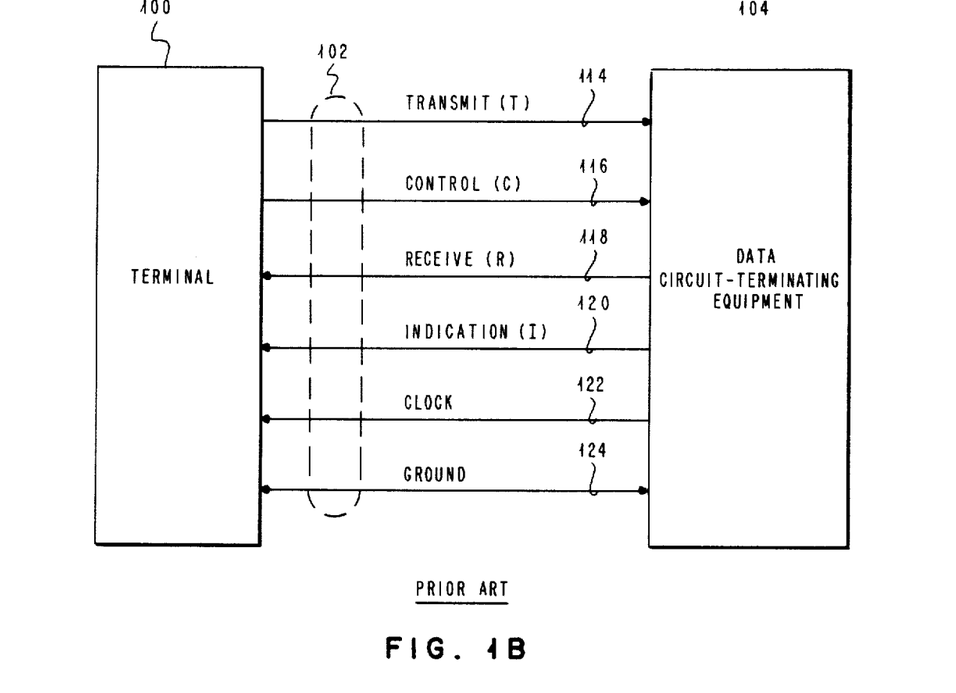
FIG. 1B is a block diagram illustrating the signal interface prescribed by the CCITT Recommendation X.21 between a terminal and data circuit-terminating equipment.

The signal interface between the terminal 100 and data circuit-terminating equipment 104 is illustrate in FIG. 1B. Line 102 of FIG. 1A is expanded to include signal lines 114, 116, 118, 120, 122 and 124 as shown. Line 114 includes the transmit signal from the terminal. Data outgoing from terminal 100 would be included on the transmit line 114. Line 116 includes a control signal. Line 118 includes a receive signal transmitted by the data circuit-terminating equipment 104 and would include incoming data to terminal 100. Line 120 is an indication signal. Lines 122 and 124 contain the clock (or signal element timing) and ground.

Figure 2:
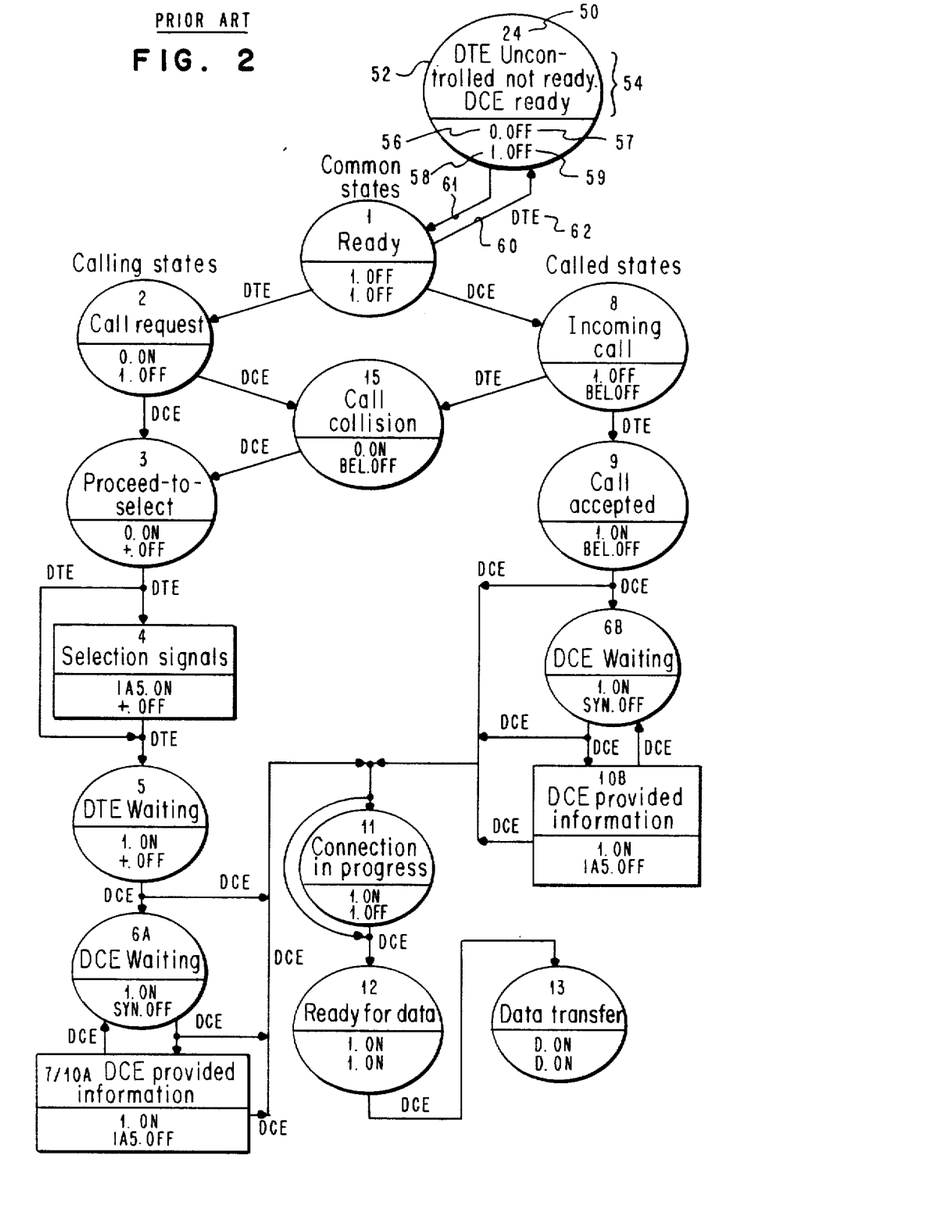
FIG. 2 is a communications procedural state diagram as prescribed by CCITT Recommendation X.21.

FIG. 2 is a procedural state diagram for switched network call establishment as prescribed by 1984 Revision of Recommendation X.21. Recommendation X.21 (which has previously been incorporated by reference) gives a very detailed explanation of the signals and communications procedures involved in implementing the Recommendation. Therefore, the reader is directed to the Recommendation for further detail. FIG. 2 is presented to illustrate that the communications procedure is represented by a state diagram. The states illustrated in FIG. 2 do not include all of the states of the Recommendation X.21 but are sufficient to illustrate the embodiment of the present invention. For more detail of the state diagram of FIG. 2, the reader is directed to the text of Recommendation X.21. In FIG. 2, state 52 will be explained so that the reader may understand nomenclature. In state 52, the state number 50 is listed in the top of the ellipse. The description of the state is listed in area 54. The abbreviation DTE represents the terminal and the abbreviation DCE represents the data circuit-terminating equipment previously discussed. The number in location 56 represents the value of the transmit signal. The description in location 57 represents the state of the control signal. The number in location 58 represents the value of the receive signal. Location 59 describes the state of the indication signal. Arrows 61 and 60 indicate the possible transfers in and out of state 52. The listing of DTE or DCE in location 62 denotes which device initiates the state change.

Figure 3:
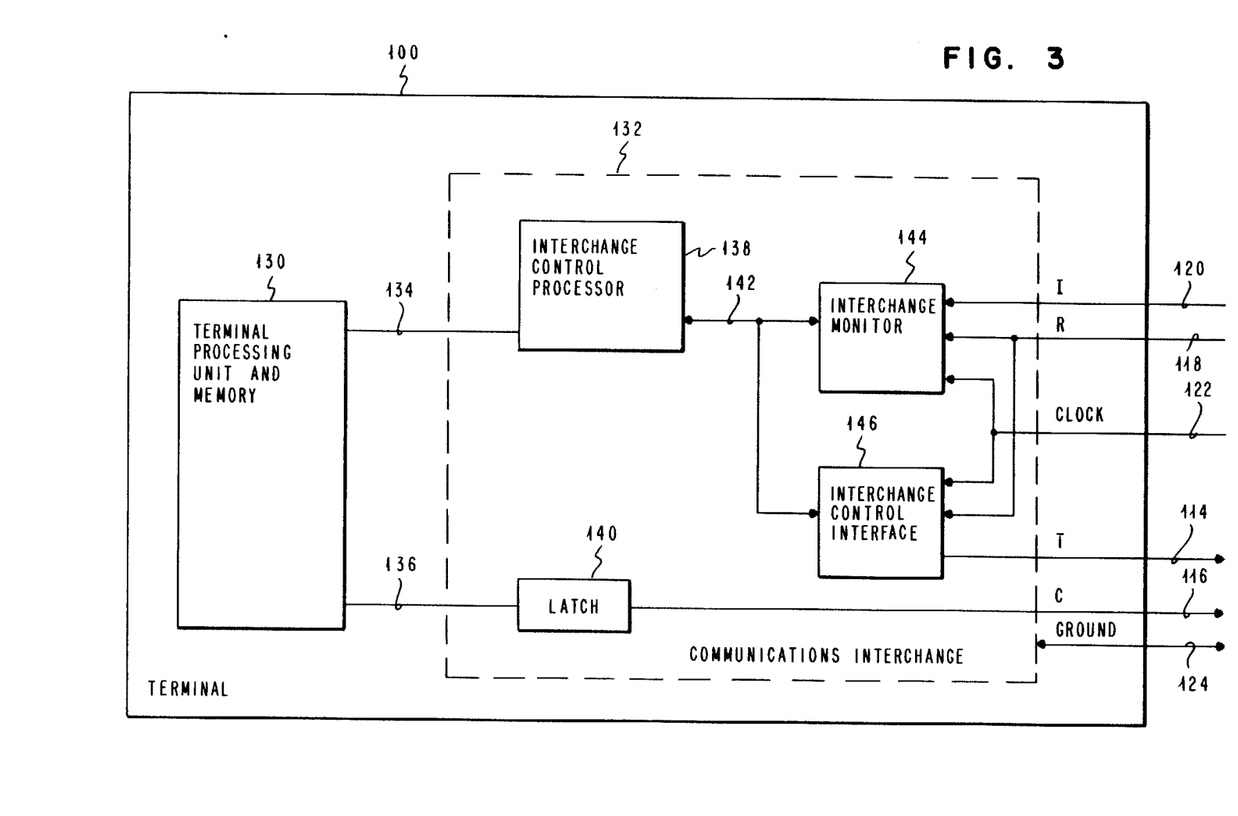
FIG. 3 is an internal block diagram of a terminal including the present invention.

The performance of the DTE procedures of FIG. 2 is accomplished by computer terminal including the present invention. FIG. 3 is a block diagram of a computer terminal such as an IBM RTPC containing the present invention. The present invention includes software that would be executed in the terminal processing unit and memory 130. The terminal processing unit and memory 130 is connected to a communications interchange circuit 132. In the present invention, the communication interchange circuit 132 is contained on an adapter card that is plugged in to the IBM RTPC peripheral bus. The communications between the terminal processing unit and memory 130 and the communications interchange circuit 132 are contained on lines 134 and 136. Line 136 contains the control signal that is latched by a latch 140 and provided on line 116. Line 134 contains control, address, data, PIO, DMA and interrupt lines between the terminal processing unit and memory 130 and an interchange control processor 138. In the present embodiment, the interchange control processor 138 is an INTEL 80C51 control processor or equivalent including a support program. The interchange control processor 138 is connected via lines 142 to an interchange monitor 144 and an interchange control interface 146. The interchange monitor 144 includes pattern recognition circuitry for recognizing patterns of the I and R signals contained on lines 120 and 118, respectively. Both the I and R signals include bit serial data streams that are provided in a continuous manner on lines 120 and 118 to the interchange monitor 144. Upon recognizing certain patterns received on lines 120 and 118, the interchange monitor 144 provides an interrupt signal via line 142 to the interchange control processor 138. Additionally, the interchange monitor 144 includes storage for storing portions of the received bit streams from lines 118 and 120 that may be read via line 142 by the interchange control processor 138 to enable the interchange control processor 138 to determine which specific pattern was detected by the interchange monitor 144. The pattern recognition circuitry of the interchange monitor 144 is contained in the patent application entitled "Communications Bit Pattern Detection Circuit", Ser. No. 873,910, filed June 13, 1986.

The receive signal on line 118 is also connected to the interchange control interface 146. The interchange control interface 146 in the preferred embodiment is an Zilog 8530 or equivalent. The interchange control interface 146 serves as a buffer that provides a data path for the input received signals on line 118 to the interchange control processor 138. Additionally, the interchange control interface 146 provides a buffer output for the transmitted data on line 114 from the interchange control processor 138 via line 142.

The interchange control processor 138 includes a support program that enables the interchange control processor 138 to interface to the terminal processing unit and memory 130 and to the interchange monitor 144 and interchange control interface 146. The purpose of the interchange control processor 138, as previously discussed, is to provide a data path from the external network to the terminal processing unit and memory 130 in a manner that will not burden the terminal processing unit and memory 130 with the requirements of performing protocol tasks in compliance with the CCITT Recommendation X.21. The software that is executed in the terminal processing unit and memory 130 to control the communications over the network is state driven in accordance with the Recommendation X.21. However, the actual control of the communications interface to the network itself is held to a minimum in order that the terminal processing unit and memory 130 is free to do other application tasks. This is made possible by the interchange control processor 138 performing the protocol tasks under the supervision of the software residing in the terminal processing unit and memory 130. Conditions on the network that indicate state changes in the communications procedure are linked to the terminal processing unit and memory 130 by the interchange control processor 138 in a unique manner. The interchange control processor 138 provides two status bytes (Master Status Byte and Second Status Byte) to the terminal processing unit and memory 130. These status bytes directly control the change of the communications state of the program residing in the terminal processing unit and memory 130 in a manner that is in accordance with the Recommendation X.21. Additionally, the interchange control processor 138 responds to commands from the terminal processing unit and memory 130 to enable the terminal to send data over the communications network.

Figure 4A:
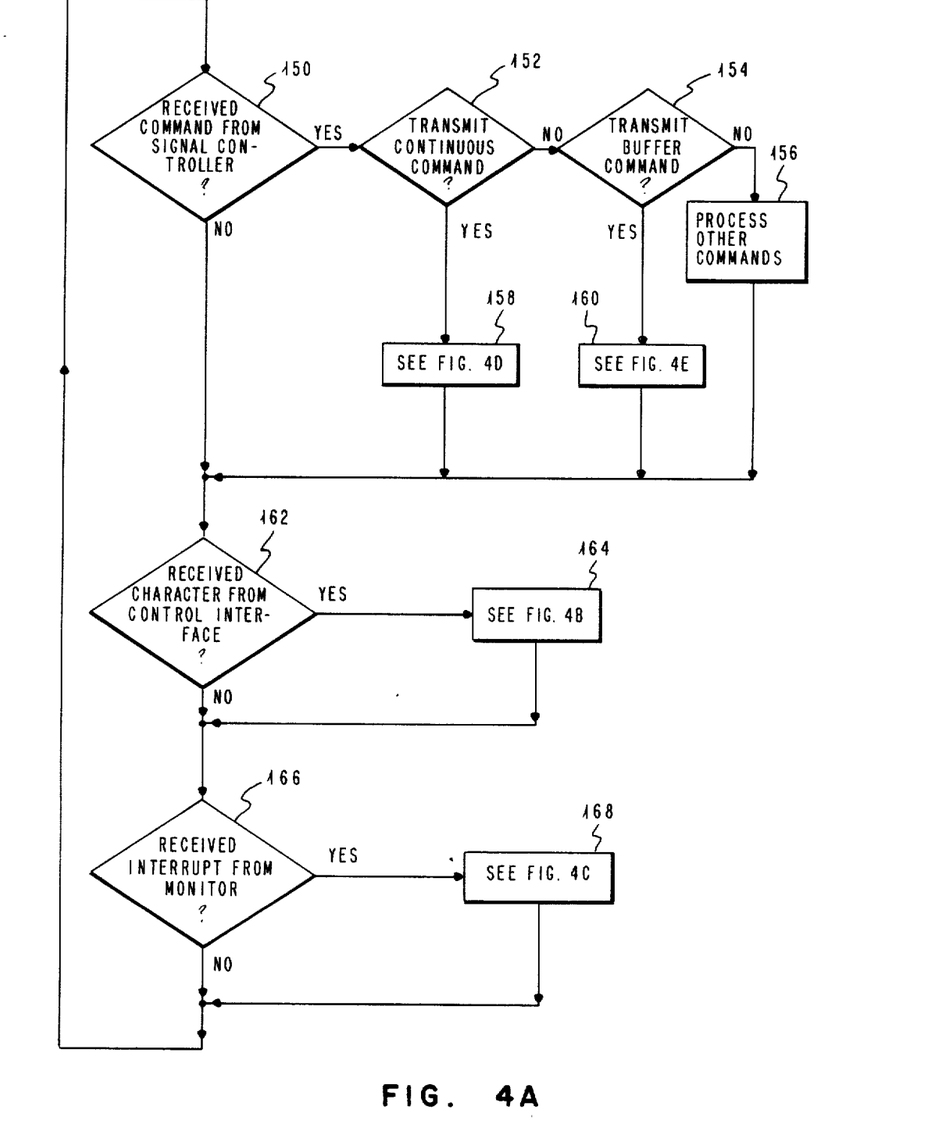
FIG. 4A is a functional flow chart illustrating the software that is executed in the interchange control processor.
Figure 4B:
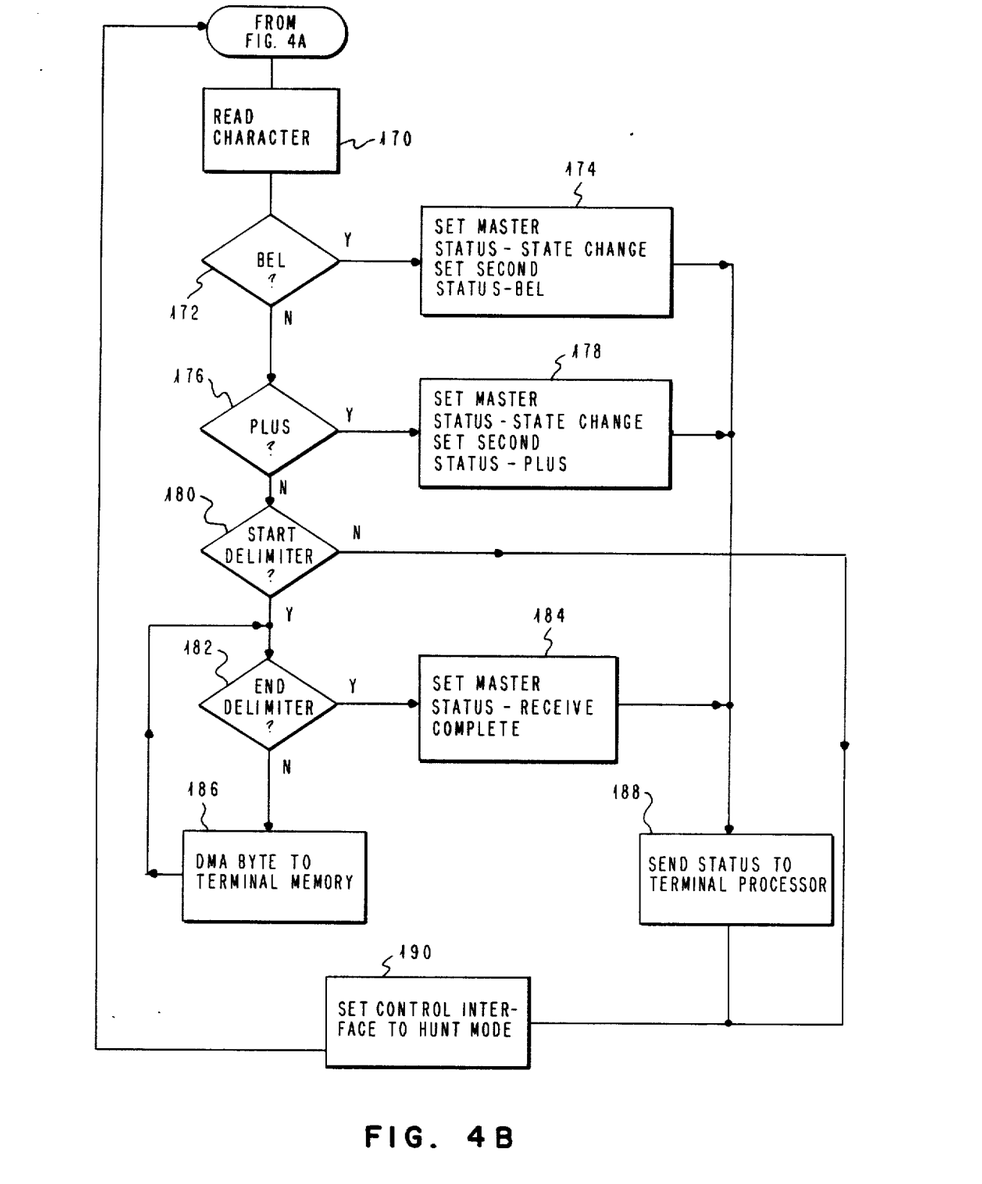
FIG. 4B is a functional flow chart illustrating the receive process of FIG. 4A.
Figure 4C:
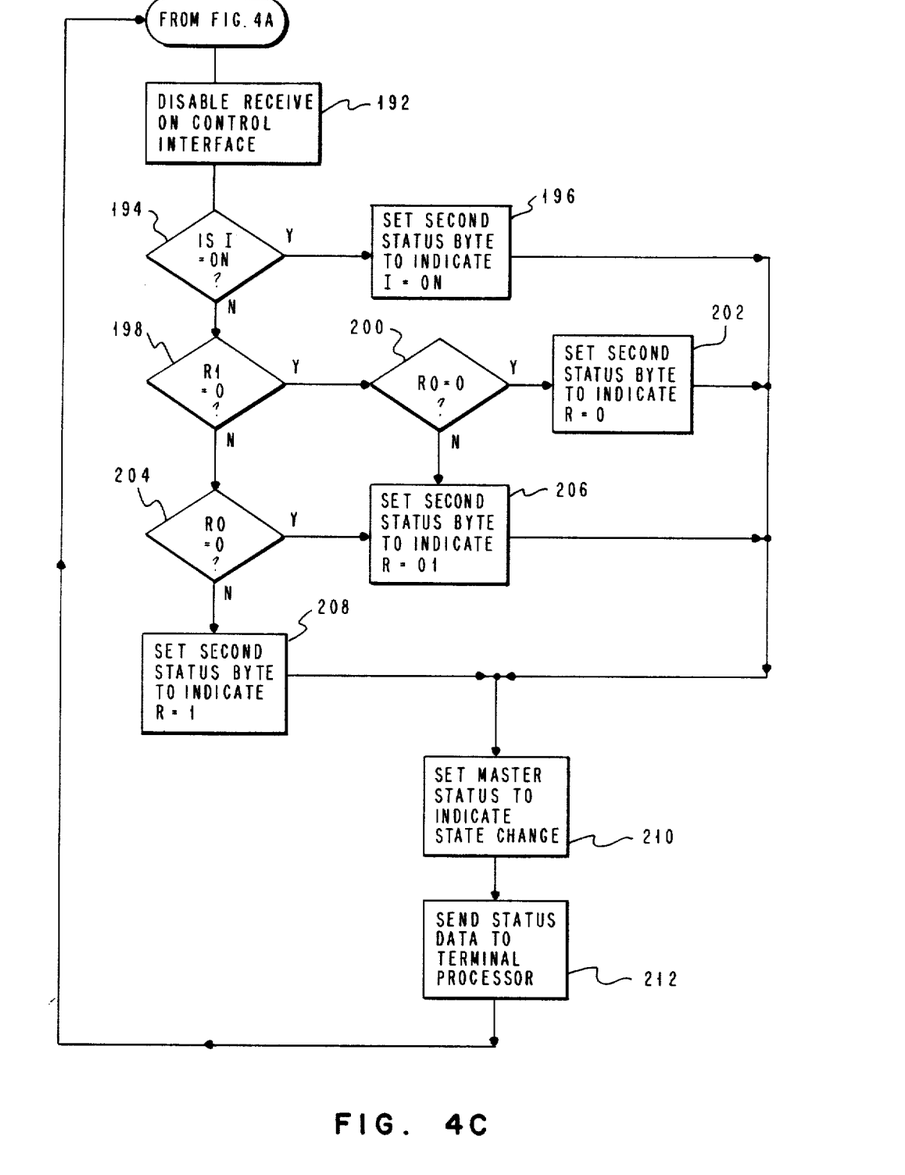
FIG. 4C is a functional flow chart of the interrupt handler of FIG. 4A.
Figure 4D:
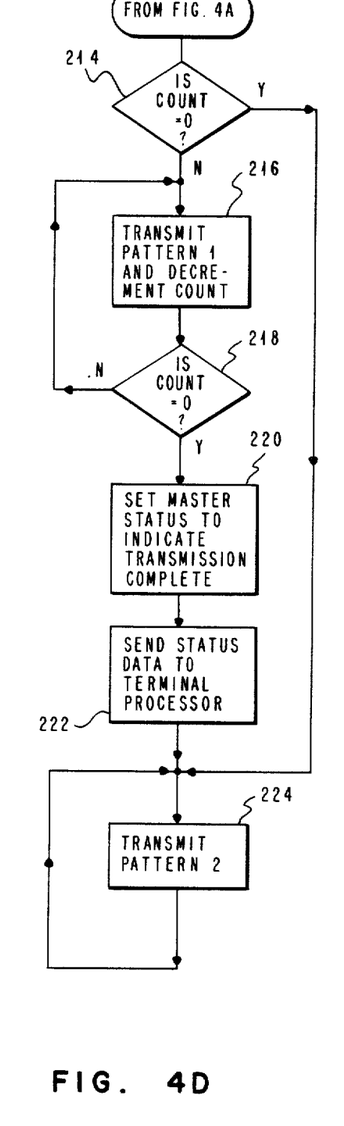
FIG. 4D is a functional flow chart of the Transmit Continuous command process of FIG. 4A.
Figure 4E:
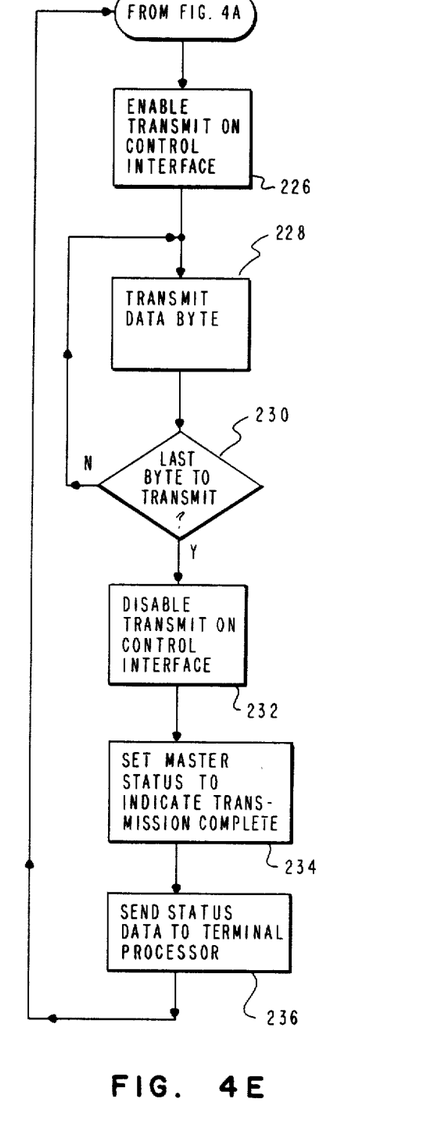
FIG. 4E is a functional flow chart of the Transmit Buffer process of FIG. 4A.

The support program resident in the interchange control processor 138 is illustrated in flow chart form in FIGS. 4A through 4E. In FIG. 4A, the flow chart illustrates a basic loop of decision states 150, 162, and 166. The processor 138 continues in this loop until directed out of the loop by one of the decision states. In state 150, the processor 138 determines if it has received a command from the communications software resident in the terminal processing unit and memory 130. This software will hereinafter be termed the signal controller. If the signal controller has sent a command, the processor 138 then determines whether the command is a transmit continuous command, state 152 or a transmit buffer command, state 154. If neither one of these commands has been received, then other commands may be processed in routine 156. It should be apparent to those skilled in the art that more than these two commands may be processed and that the processing of additional commands such as initialization and enable commands would be performed in a manner similar to the processing of these present commands in states 152 and 154. If the Transmit Continuous command has been received, then processor 138 performs a procedure 158 that is illustrated in FIG. 4D. Likewise, if the Transmit Buffer command has been received, then the processor 138 executes a procedure 160 that is illustrated in FIG. 4E. After processing any of the commands from the signal controller, processor 138 performs decision 162 to determine if it has received a character from the interchange control interface 146. The reception of a character is defined in the Recommendation X.21 specification. If a character has been received, processor 138 executes process 164 which is illustrated in FIG. 4B.

The processor 138 then executes decision 166 to determine if an interrupt has been received from the interchange monitor 144. If an interrupt has been received, then the processor 138 performs the process 168 which is illustrated in FIG. 4C.

FIG. 4B illustrates the microcode program that is executed by processor 138 when a character is read from the interchange control interface 146. At first the character is loaded from the interchange control interface 146 into processor 138 and the processor 138 proceeds with decision 172 to determine if the character is a BEL character. If so, processor 138 performs process 174 which sets the Master Status Byte to indicate that a state change has occurred. The Second Status Byte is then set to reflect the reception of the BEL character. If the character was not a BEL, then processor 138 proceeds to decision 176 to determine if the character was a PLUS. If so, process 178 is executed which sets the Master Status Byte to indicate a state change and the Second Status Byte to indicate a reception of the PLUS character. If the received character was neither a BEL or a PLUS, then the processor 138 determines if the received character was a start delimiter in decision 180. In this context, a start delimiter can be interpreted to be any of the set of character codes that are defined by Recommendation X.21 (or applicable country unique specifications) to be valid first characters of an X.21 network control information sequence. If not, the processor 138 proceeds to process 190 which sets the interchange control interface 146 into a mode to examine the incoming data on the R signal line 118. If a start delimiter was received, then processor 138 proceeds with decision 182 to determine if the end delimiter has been received. If the end delimiter (defined in a manner similar to the start delimiter) has not been received, then processor 138 proceeds with process 186 to provide the data received to the terminal processing unit in memory 130 via a direct memory access (DMA channel) over lines 134. After the data has been sent, processor 138 continues to search for the end delimiter. Once the end delimiter has been received, processor 138 performs process 184 which sets the Master Status Byte to reflect a receive complete condition. The processor then proceeds from processes 174, 178, and 184 to process 188 which sends the status bytes, including the Master Status Byte and the Second Status Byte to the terminal processor unit and memory 130. The processor then performs process 190 to set the interchange control interface 146 into a hunt mode to look for specific bit stream patterns.

FIG. 4C illustrates the microcode program executed when an interrupt from the interchange monitor 144 has been received. Processor 138 performs process 192 to disable the receive function of the interchange control interface 146. Processor 138 then reads an internal register within the interchange monitor 144 to look at the I and R signals. The I signal from line 120 is stored as a single bit and the last two bit times of the R signal on line 118 is stored as two bits, R1 and R0. In decision 194, processor 138 determines if I is equal to ON. If so, processor 138 performs process 196 to set the second status byte to indicate that I is equal to ON. If I is equal to OFF, the processor 138 proceeds to decision 198 to determine if R1 is equal to 0. If so, then it is determined if R0 is equal to 0 in decision 200. If so, then the processor 138 proceeds with process 202 to set the Second Status Byte to indicate that R is equal to 0. If R1 is not equal to 0 as in decision 198, the processor 138 proceeds to decision 204 to determine if R0 is equal to 0. If so, then the Second status Byte is set to indicate that R is equal to 01 in process 206. If R0 is not equal to 0 in decision 204, then processor 138 proceeds with process 208 to set the Second Status Byte to indicate that R is equal to 1. After performing either of processes 196, 202, 206 or 208, the processor 138 performs process 210 which sets the Master Status Byte to indicate a state change and proceeds to process 212 to send the status data to the terminal processing unit and memory 130.

FIG. 4D illustrates the support program for performing a Transmit Continuous command. The processor 138 determines in decision 214 if the count received is a 0. If so, the processor 138 proceeds to transmit the second received pattern in process 224. If the count is not 0, the processor then transmits the first pattern in process 216 and decrements the count. Again, the count is checked to see if it is 0 in decision 218. If not, the processor continues to send the first pattern until the count is 0. Once the count is 0, processor 138 performs process 220 which sets the Master Status Byte to indicate that the transmission has been completed and the status data is then sent to the terminal processing unit and memory as per process 222. Transmission of Data Pattern 2 will then continue indefinitely until a subsequent command overrides this operation.

FIG. 4E illustrates the microcode program to perform the execution of the Transmit Buffer command. First processor 138 enables the interchange control interface 146 to transmit as per process 226. The data that is to be transmitted is received from the terminal processing unit and memory 130 over lines 134 into a memory buffered area in interchange control processor 138 via a DMA. Processor 138 then determines if this was the last byte to be transmitted, per decision 230, by looking at the terminal count from a DMA controller (not shown). If not, the DMA count is decremented and the processor 138 continues to transmit. Once the last byte has been transmitted, processor 138 proceeds to step 232 to disable the transmit function of the interchange control interface 146. The Master Status Byte is then set to indicate the transmission complete in process 234 and this status data is sent to the terminal processing unit and memory 130 in step 236.

Figure 5:
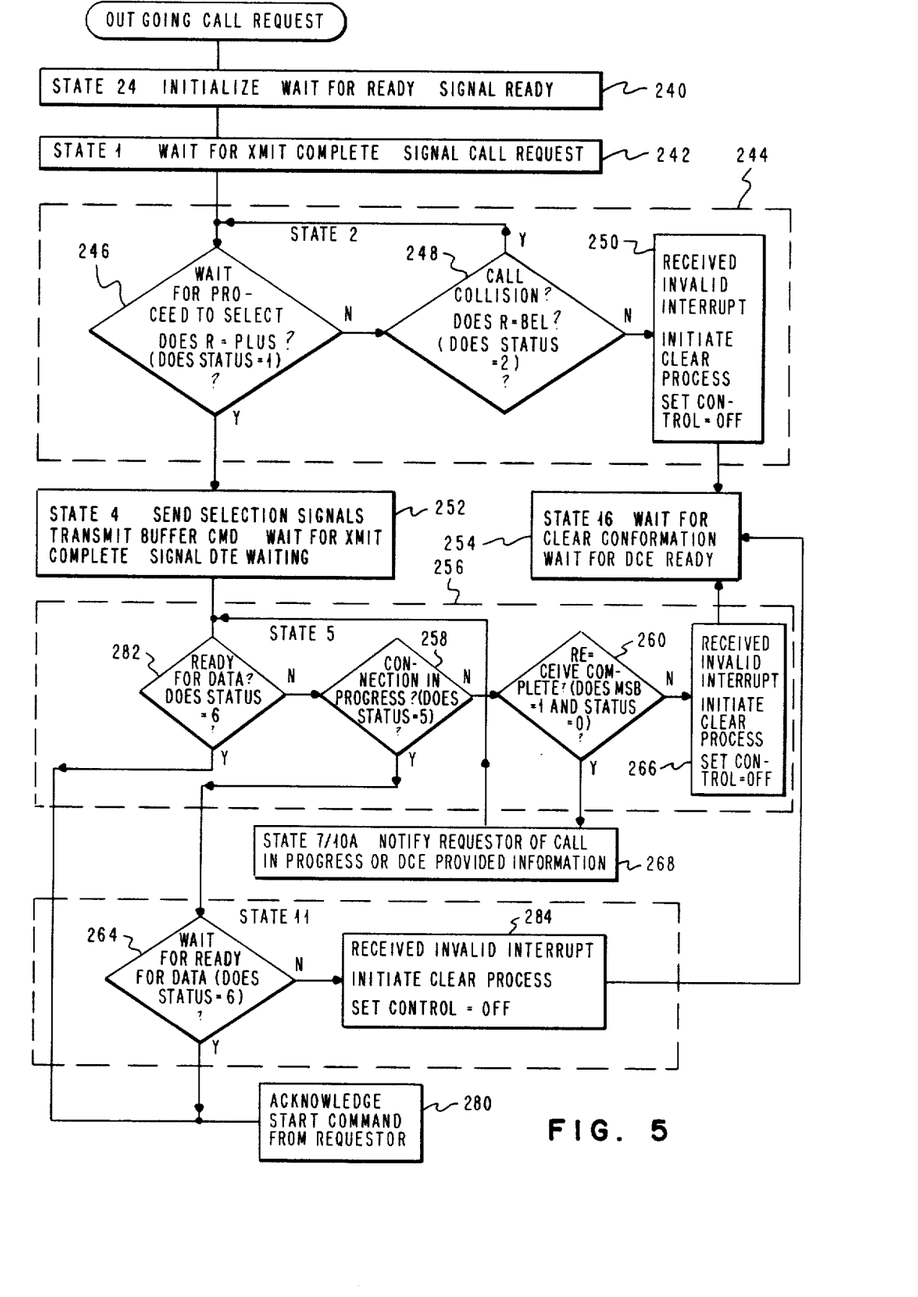
FIG. 5 is a functional flow chart of the device driver software resident in the terminal processing unit and memory.

FIG. 5 is a flow chart illustrating the communications signal state control program that is executed in the terminal processing unit and memory 130. The purpose of this software is to control the link to the network to provide communications between the terminal processing unit and memory 130 and the network. It should be apparent that there is a correlation between the state numbers of the program states in FIG. 5 and the communications procedure states illustrated in FIG. 2. In FIG. 5, the terminal processing unit and memory 130 begin executing process 240 when a call request is received from other software in the terminal to initialize a call. In process 240, the signal controller is in state 24 and initializes the adapter. This entails waiting for the data circuit-terminating equipment to indicate a ready state which would be indicated to the signal controller by receiving a Master Status Byte indicating a state change and a Second Status Byte of 5 from the interchange control processor 138. At this time, the terminal processing unit 130 signifies a ready signal by sending a Transmit Continuous command to the interchange control processor 138. Terminal processor 130 then proceeds to process 242 representing State 1 and waits for the transmission complete signal from the interchange control processor 138 which is indicated by the Master Status Byte being set at 2. At this time, the terminal processor 130 sets the Control signal on line 136 to ON and proceeds to process 244, State 2. In process 244, decision 246 is first encountered which places the terminal processor 130 into a wait state until a Master Status Byte indicating a state change and a Second Status Byte of 1 has been received. If the Master Status Byte is received and not 1, then the Second Status Byte is examined to see if it is 2 representing a BEL signal in decision 248. If neither a BEL nor a PLUS is received, process 250 is entered which indicates an invalid condition having detected an invalid interrupt and and processor 130 initiates a clear process. The Control signal on line 136 is turned off and a Transmit Continuous command with 0 patterns is sent to the interchange control processor 138. The processor 130 then exits to State 16 in process 254. Returning to decision 248 if a BEL signal is received, then processor 130 returns to decision 246 to determine if a PLUS has been receive (i.e. a Second Status Byte of 1). Upon receiving a PLUS, the processor 130 proceeds to process 252, State 4 to send selection signals including a Transmit Buffer command. Processor 130 then waits for the transmit complete indication consisting of the transmit complete indication in the master status byte. A Transmit Continuous command is then sent to the interchange control processor 138 to indicate the DTE waiting state as defined by the X.21 Recommendation.

At this point, processor 130 enters State 5, block 256 where it first encounters decision 282 to determine if the DCE is ready for data by determining in the Second Status Byte is 6 indicating that the I signal, line 120, has been turned on. If not ready for data, processor 130 proceeds with process 258 waiting for the connection in process by waiting for a Master Status Byte indicating a state change and a Second Status Byte of 5 indicating that R is equal to 1. If this is not received, then the Master Status Byte is examined to see if there is a receive complete indication in decision 260. If not, then process 266 is entered which detects an invalid interrupt and initiates the clear process. Again, the Control signal is turned off. At this point, processor 130 then enters State 16, process 254. If the receive complete indication and the Master Status Byte is received in decision 260, process 268 is entered wherein the initiating program is informed of the call progress signal or that the data circuit-terminating equipment has provided the data. Upon exiting process 268, decision 282 is then re-entered. Upon the reception of R is equals 1 in decision 258, processor 130 enters process 264, State 11 which is a decision looking for a Master Status Byte indicating state change and a Second Status Byte indicating that I has been turned on. If some other indication is received, then processor 130 enters process 284 which is similar to process 266 and indicates an invalid interrupt and initiates the clear process exiting this process into process 254 of State 16 waiting for the confirmation of clear. However, if the Second Status Byte in decision 264 does indicate I has been turned on, then State 12 is entered and acknowledgement is sent to the call requestor. Additionally, in process 282 if the link is ready for data, then processor 130 proceeds to process 280 and State 12.

It should be apparent from the flow chart in FIG. 5 that the transition between the communications procedures states is controlled directly by the status information received from the interchange control processor 138. By structuring the software in the interchange control processor 138 and the software in the terminal processing unit and memory 130 in this manner, control of the communications link in the terminal processing unit and memory 130 is maintained without the burden of performing the communications protocol tasks that are in turn performed by the interchange control processor 138 in connection to the interchange monitor 144, the interchange control interface 146 and the latch 140 in the communications interchange circuit 132.

Figure 6A:
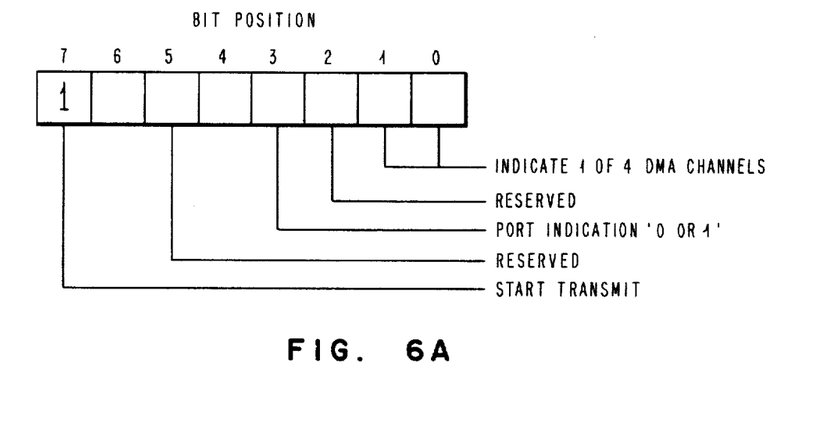
FIG. 6A is a diagram of the Transmit Buffer command.
Figure 6B:
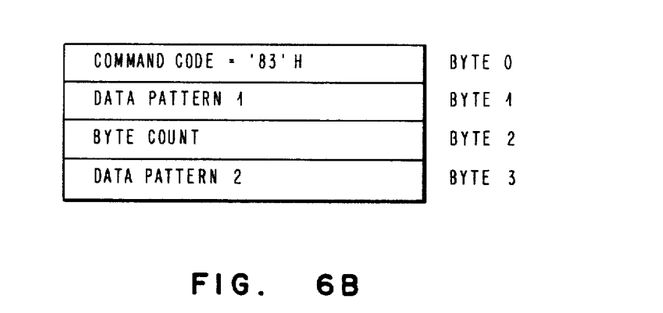
FIG. 6B is a diagram of the Transmit Continuous command.

FIGS. 6A and 6B illustrates the contents of the Transmit Buffer and Transmit Continuous commands respectively. The Transmit Buffer command illustrated in FIG. 6A is a straightforward transmit command. However, the Transmit Continuous command illustrated in FIG. 6B is unique. This novel command structure enables two patterns to be sent via the communications link by a single command. This is important in the present invention because it allows for the terminal processor 130 to actually progress through two separate state changes in accordance with the X.21 Recommendation by issuing a single command.

Figure 7A:
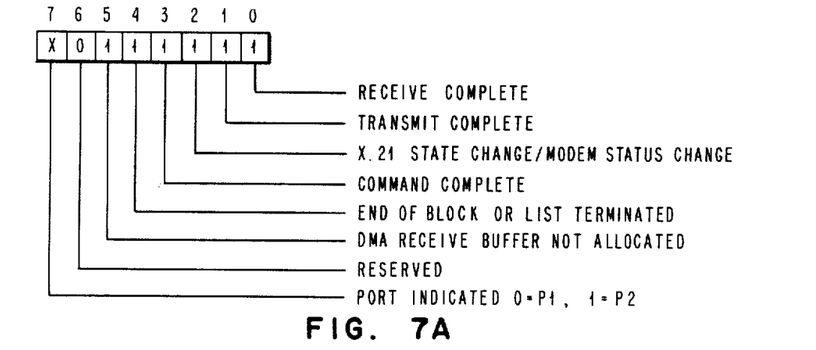
FIG. 7A is a bit diagram of the Master Status Byte.
Figure 7B:
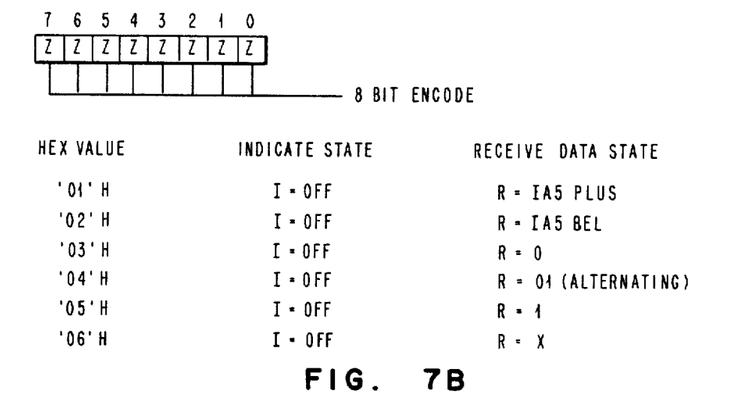
FIG. 7B is a bit diagram of the Second Status Byte denoting a program state change.
Figure 7C:
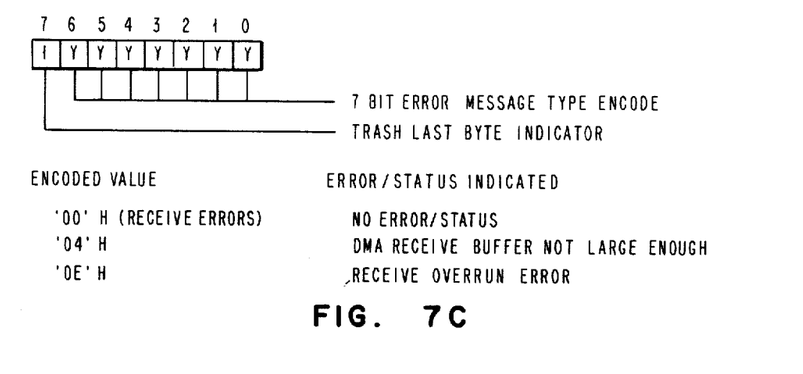
FIG. 7C is a bit diagram of the Second Status Byte denoting a receive complete condition.

Another unique and novel feature of the present invention is the use of the Master Status Byte and the Second Status Byte in the communications between the terminal processor 130 and the interchange control processor 138. The Master Status Byte is illustrated in FIG. 7A and the Second Status Byte is illustrated in FIGS. 7B and 7C illustrating a state change (FIG. 7B) and a receive complete condition (FIG. 7C).

Although the invention has been described with reference to this specific embodiment, this description is not meant to be construed in a limiting sense. Various modifications of the disclosed embodiment as well as other embodiments of the invention, will become apparent to those persons skilled in the art upon reference to the description of this invention. It is, therefore, contemplated that the appended claims will cover any such modifications or embodiments as fall within the true scope of the invention.

We claim:

1. In a communications network including a network bus interconnecting a plurality of terminals, each terminal including terminal communications circuitry providing communications through a bus interface circuit to the network bus in accordance with a predetermined communications procedure including a series of communications states to be traversed for establishing communications between terminals, the terminal communications circuitry comprising:

communications interchange means for exchanging protocol signals with said bus interface circuit, further including an electrical interchange means for exchanging protocol signals with the bus interface circuit and exchanging protocol control information with a physical interface means, said physical interface means including means for interpreting said protocol control information received from said electrical interchange means to provide signal state change information to a signal state controller means and for interpreting commands from said signal state controller means to provide protocol control information to the electrical interchange means and including means for receiving a command from a signal state controller means and providing, in response thereto, an exchange of a sequence of protocol signal patterns to said bus interface circuit for traversing a plurality of said communication states to establish data communications with another terminal and further including means for providing signal state change information to the signal state controller means indicating bus traffic; and said signal state controller means for providing commands to the communications interchange means to control communications over said network bus in accordance with the predetermined communications procedure to control communications over the bus and including means for executing one of a plurality of program states to control communications over said network bus in accordance with the predetermined communications procedure by providing commands to the communications interchange means in accordance with which program state the signal state controller means is currently executing and for changing the program state in response to the state change information from the communications interchange means.

2. The communications circuitry according to claim 1 wherein the electrical interchange means includes recognition means for recognizing predetermined protocol signal patterns received from the bus interface circuitry and in response thereto providing a signal to the physical interface means indicating that a protocol pattern has been received.

3. The communications circuitry according to claim 2 wherein said electrical interchange means further includes means for storing at least a portion of the received and recognized protocol signal pattern.

4. The communications circuitry according to claim 3 wherein said physical interchange means includes means for reading the stored protocol pattern in the electrical interchange means, analyzing the received pattern and providing a signal to the signal state controller means indicating the reception of one of a plurality predetermined protocol signal patterns and providing said state change information in accordance with the specific protocol signal pattern received.

5. The communications circuitry according to claim 4 wherein said state change information represents status data from the physical interchange means.

6. The communications circuitry according to claim 5 wherein said program states in the signal state controller means include communications states specified by the predetermined communications procedure.

7. The communications circuitry according to claim 6 wherein said signal state controller means includes means for receiving communications requests from application programs in a terminal requesting access to the communications network.

8. In a communications network including a network bus interconnecting a plurality of terminals, each terminal including terminal communications circuitry providing communications through a bus interface circuit to the network bus in accordance with a predetermined communications procedure including a series of communications states to be traversed for establishing communications between terminals for making outgoing or receiving incoming calls on the network bus, the terminal communications circuitry comprising:

communications interchange means for exchanging protocol signals with said bus interface circuit, and including:

an electrical interchange means for exchanging protocol signals on a plurality of lines of a single communications channel with the bus interface circuit and exchanging protocol control information with a physical interface means, and said physical interface means for interpreting said protocol control information received from said electrical interchange means to provide communications state change information to a signal state controller means, and including means for receiving a command from the signal state controller means and providing, in response thereto, an exchange of a sequence of protocol signal patterns to said electrical interchange means for traversing a plurality of said communication states; and said signal state controller means for executing one of a plurality of program states to control communications over said network bus in accordance with the predetermined communications procedure by providing commands to the communications interchange means in accordance with which program state the signal state controller means is currently executing in response to a request from the terminal for making an outgoing call and for changing the program state in response to communications state change information from said communications interchange means in response to incoming calls.

9. The communications circuitry according to claim 8 wherein said communications interchange means further includes means for providing data from the bus interface circuit to the signal state controller means.

10. The communications circuitry according to claim 9 wherein the electrical interchange means includes recognition means for recognizing predetermined protocol signal patterns received from the bus interface circuit and in response thereto providing a signal to the physical interchange means indicating that a protocol pattern has been received.

11. The communications circuitry according to claim 10 wherein said electrical interchange means further includes means for storing at least a portion of the received and recognized protocol signal pattern.

12. The communications circuitry according to claim 11 wherein said physical interchange means includes means for reading the stored protocol pattern in the electrical interchange means, analyzing the received pattern and providing a signal to the signal state controller means indicating the reception of one of a plurality of predetermined protocol signal patterns and providing said state change information in accordance with the specific protocol signal pattern received.

13. The communications circuitry according to claim 12 wherein said state change information represents status data from the physical interchange means.

14. The communications circuitry according to claim 13 wherein each of said program states in the signal state controller means includes at least one communications state specified by the predetermined communications procedure.

15. The communications circuitry according to claim 14 wherein said signal state controller means includes means for receiving communications requests from application programs in a terminal requesting access to the communications network.

* * * * *